(12) United States Patent
Zhang

(10) Patent No.: US 9,092,696 B2
(45) Date of Patent: Jul. 28, 2015

(54) IMAGE SIGN CLASSIFIER

(71) Applicant: HEWLETT-PACKARD DEVELOPMENT COMPANY, L.P., Houston, TX (US)

(72) Inventor: Tong Zhang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 147 days.

(21) Appl. No.: 13/850,413

(22) Filed: Mar. 26, 2013

(65) Prior Publication Data

US 2014/0294291 A1 Oct. 2, 2014

(51) Int. Cl.
*G06K 9/00* (2006.01)
*G06K 9/62* (2006.01)

(52) U.S. Cl.
CPC .......... *G06K 9/6256* (2013.01); *G06K 9/00818* (2013.01)

(58) Field of Classification Search
USPC .......................... 382/104, 159, 217, 224–228; 348/113–120
See application file for complete search history.

(56) References Cited

U.S. PATENT DOCUMENTS

| | | | | |
|---|---|---|---|---|
| 5,774,357 | A * | 6/1998 | Hoffberg et al. | 713/600 |
| 5,844,505 | A * | 12/1998 | Van Ryzin | 340/988 |
| 6,266,442 | B1 * | 7/2001 | Laumeyer et al. | 382/190 |
| 6,453,056 | B2 * | 9/2002 | Laumeyer et al. | 382/104 |
| 7,466,841 | B2 * | 12/2008 | Bahlmann et al. | 382/103 |
| 7,515,736 | B2 * | 4/2009 | Retterath et al. | 382/103 |
| 8,041,080 | B2 * | 10/2011 | Porikli et al. | 382/104 |
| 8,064,643 | B2 * | 11/2011 | Stein et al. | 382/104 |
| 8,233,670 | B2 * | 7/2012 | Moed et al. | 382/113 |
| 8,447,139 | B2 * | 5/2013 | Guan et al. | 382/291 |
| 8,483,447 | B1 * | 7/2013 | Arfvidsson et al. | 382/113 |
| 8,509,478 | B2 * | 8/2013 | Haas et al. | 382/100 |
| 8,538,141 | B2 * | 9/2013 | Sakimura et al. | 382/159 |
| 8,687,879 | B2 * | 4/2014 | Cotman et al. | 382/156 |
| 8,755,572 | B1 * | 6/2014 | Arfvidsson et al. | 382/113 |
| 2001/0036293 | A1 * | 11/2001 | Laumeyer et al. | 382/104 |
| 2002/0186882 | A1 * | 12/2002 | Cotman et al. | 382/165 |
| 2004/0086153 | A1 * | 5/2004 | Tsai et al. | 382/104 |
| 2005/0249378 | A1 * | 11/2005 | Retterath et al. | 382/104 |
| 2006/0034484 | A1 * | 2/2006 | Bahlmann et al. | 382/103 |
| 2008/0137908 | A1 * | 6/2008 | Stein et al. | 382/103 |
| 2008/0240499 | A1 * | 10/2008 | Porikli et al. | 382/103 |
| 2008/0240572 | A1 * | 10/2008 | Hoshii | 382/190 |

(Continued)

FOREIGN PATENT DOCUMENTS

| | | |
|---|---|---|
| CN | 102881160 A | 1/2013 |
| EP | 1096457 A2 | 5/2011 |
| JP | 2000293670 A | 10/2000 |

OTHER PUBLICATIONS

Andrzej Ruta et al, "Real-time Traffic Sign Recognition from Video by Class-specific Discriminative Features", 2009.

(Continued)

*Primary Examiner* — Aaron W Carter
(74) *Attorney, Agent, or Firm* — Hewlett-Packard Patent Department

(57) ABSTRACT

Examples disclosed herein relate to an image sign classifier. In one implementation, a processor causes a user interface to be displayed to receive information related to a target sign type in an image. The processor may train an image sign classifier based on the information to recognize the target sign type and output information related to the trained classifier.

20 Claims, 4 Drawing Sheets

(56) References Cited

U.S. PATENT DOCUMENTS

| | | |
|---|---|---|
| 2009/0074249 A1* | 3/2009 | Moed et al. .................. 382/104 |
| 2009/0232358 A1* | 9/2009 | Cross ............................ 382/103 |
| 2010/0111396 A1* | 5/2010 | Boucheron .................. 382/133 |
| 2010/0328316 A1* | 12/2010 | Stroila et al. ................. 345/441 |
| 2010/0328462 A1* | 12/2010 | Chen ............................ 348/148 |
| 2011/0109476 A1* | 5/2011 | Porikli et al. ................ 340/905 |
| 2011/0170769 A1* | 7/2011 | Sakimura et al. ............ 382/159 |
| 2011/0184895 A1* | 7/2011 | Janssen ......................... 706/12 |
| 2011/0249867 A1* | 10/2011 | Haas et al. .................... 382/103 |
| 2012/0002053 A1* | 1/2012 | Stein et al. ................... 348/148 |
| 2012/0065940 A1* | 3/2012 | Retterath et al. ............. 702/189 |
| 2012/0128210 A1* | 5/2012 | Zobel ............................ 382/103 |
| 2013/0070986 A1* | 3/2013 | Peleg et al. .................. 382/128 |
| 2013/0077830 A1* | 3/2013 | Liu et al. ....................... 382/104 |
| 2013/0201334 A1* | 8/2013 | C et al. ......................... 348/148 |
| 2013/0271613 A1* | 10/2013 | Retterath et al. ............. 348/169 |
| 2014/0036269 A1* | 2/2014 | Retterath et al. ............. 356/445 |
| 2014/0079314 A1* | 3/2014 | Yakubovich et al. ......... 382/159 |
| 2014/0112532 A1* | 4/2014 | Faber et al. .................. 382/103 |
| 2014/0193033 A1* | 7/2014 | Huth ............................. 382/103 |
| 2014/0294291 A1* | 10/2014 | Zhang .......................... 382/159 |

OTHER PUBLICATIONS

Hasan Fleyeh, "Traffic and Road Sign Recognition", 2008.
Yangxing, Liu "Reliable Classification System for Diverse Traffic Sign Patterns", 2007.

* cited by examiner

IMAGE SIGN CLASSIFIER

BACKGROUND

An image classifier may be used to detect a particular type of object in an image. An image classifier may use a machine learning method to detect the presence of the object in the image based on a training data set. As an example, an image classifier may detect a face in an image.

BRIEF DESCRIPTION OF THE DRAWINGS

The drawings describe example embodiments. The following detailed description references the drawings, wherein.

DETAILED DESCRIPTION

In one implementation, a sign classifier development tool provides a user interface to receive target traffic sign characteristic information as well as a set of training images including the particular traffic sign. A sign image classifier may be automatically created to recognize a particular type of sign based on the information received from the user interface, and the sign classifier may be used to determine if an image includes a sign of the particular type.

In one implementation, the user interface allows a user to manually select a shape and color category for the target sign type. The user interface may further determine features of the sign such that the classifier automatically determines different classes of the particular sign type. Traffic signs may include similar characteristics. For example, the colors may typically be limited to red, blue, yellow, green, orange, and black, and the shapes may be typically limited to round, triangle, rectangle, diamond, or octagon. In some cases, the sign characteristics are the same despite geographic and language differences. For example, stop signs in the United States, Europe, and China each have an octagon shape. Signs for similar information may include particular features, such as Japanese warning signs being yellow diamond shaped and Chinese forbidding signs being round with a red rim and black icons. The common features may be used by a processor to classify signs within the particular sign type into different categories based on the information received from the user interface. In one implementation, the user interface further allows a user to provide information about preferred methods for creating the sign image classifier The user input may allow the user to create the classifier with the standard development tool while tailoring it to the particular sign classifier being created.

Automatic detection of road signs may be used in, for example, map metadata generation, highway maintenance, driver support systems, and intelligent autonomous vehicles. A development tool that allows tailored recognition of such signs may be useful for adapting a mapping program to new signs or a new class of signs, such as a group of signs for a different geographic area.

Figure 1:
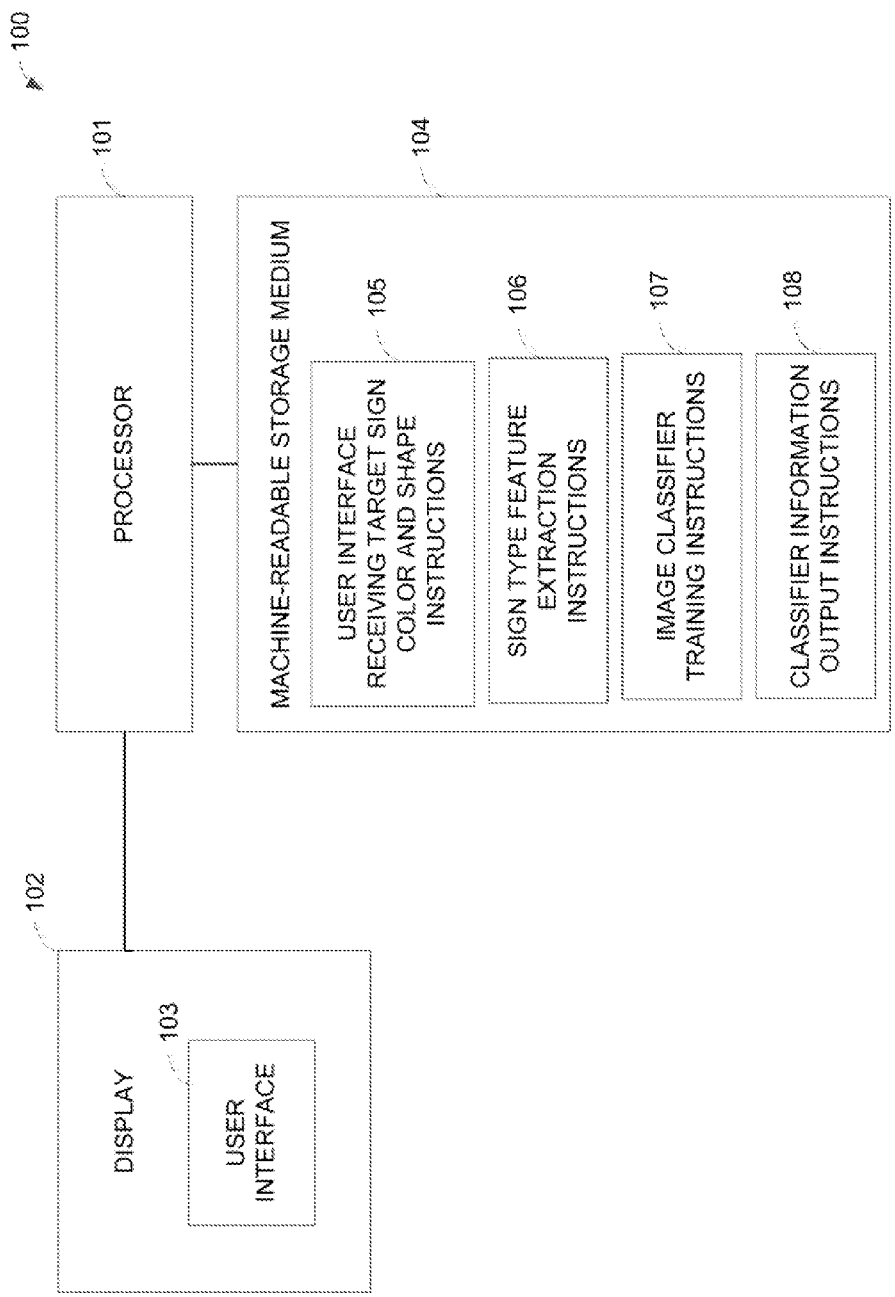
FIG. 1 is a block diagram illustrating one example of a computing system 100 to create an image sign classifier.

FIG. 1 is a block diagram illustrating one example of a computing system 100 to create an image sign classifier. For example, the computing system 100 may provide a tool to allow a user to create a particular type of image sign classifier. The image sign classifier may then be used to classify signs in newly presented images. As an example, the computing system 100 may allow a developer to create an image sign classifier by providing input to a user interface that is generated by the computing system 100. The created image sign classifier may be used on input images, such as images obtained by GPS data. The computing system 100 may include a processor 101, a machine-readable storage medium 104, and a display 102. The computing system 100 may be a standalone device or a networked computing system. In one implementation, the display 102 is associated with a client device, and the client device communicates with the processor 101 via a network.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The display 102 may be any suitable display for showing information to a user. The display 102 may display a user interface 103 to display image sign classifier information to a user. The user interface 103 may be, for example, associated with a web page or a group of web pages. The user interface 103 may allow a user to provide information to the processor about criteria for the image classifier. For example, the display 102 may be associated with a client device communicating with the processor 101 via a network. The client device may include an input device to allow a user to provide information through the user interface 103. The processor 101 may cause the user interface 103 to be displayed on the display 102.

The processor 101 may communicate with the machine-readable storage medium 104. The machine-readable storage medium 104 may be any suitable machine readable medium, such as an electronic, magnetic, optical, or other physical storage device that stores executable instructions or other data (e.g., a hard disk drive, random access memory, flash memory, etc.). The machine-readable storage medium 104 may be, for example, a computer readable non-transitory medium. The machine-readable storage medium 104 may include user interface receiving target color and shape instructions 105, sign type feature extraction instructions 106, image classifier training instructions 107, and classifier information output instructions 108.

The user interface receiving target color and shape instructions 105 includes instructions to cause a user interface 103 to be displayed on the display 102 to receive color and shape information related to a target sign type in an image. The user interface 103 may also receive a training data set including images of the target sign type. The user interface 103 may allow the user to indicate a color and shape as well as provide images of the sign type with the particular color and shape.

The sign type feature extraction instructions 106 may include instructions to extract feature information from the training data set. For example, the feature extraction may be performed to extract features of the particular sign type to provide better sign recognition. The feature extraction may allow for categorization between different classes of the same sign type, such as different types of warning signs that share a similar shape, color, and font but include some differentiating features.

The image classifier training instructions 107 may include instructions to train an image sign classifier based on the color, shape, and feature information to recognize the target sign type. In one implementation, the user interface 103 allows the user to provide information about a preferred method for training the image classifier, such as a method for color, shape, and/or feature detection.

The classifier information output instructions 108 may include instructions to output information related to the trained classifier. For example, information related to the trained classifier may be stored, displayed, or transmitted. In one implementation, the classifier may be transmitted to another device where new input images may be classified according to whether they include the particular sign type. In some cases, multiple classifiers may be applied such that an input image may be analyzed to determine if it includes any of a group of sign types.

Figure 2:
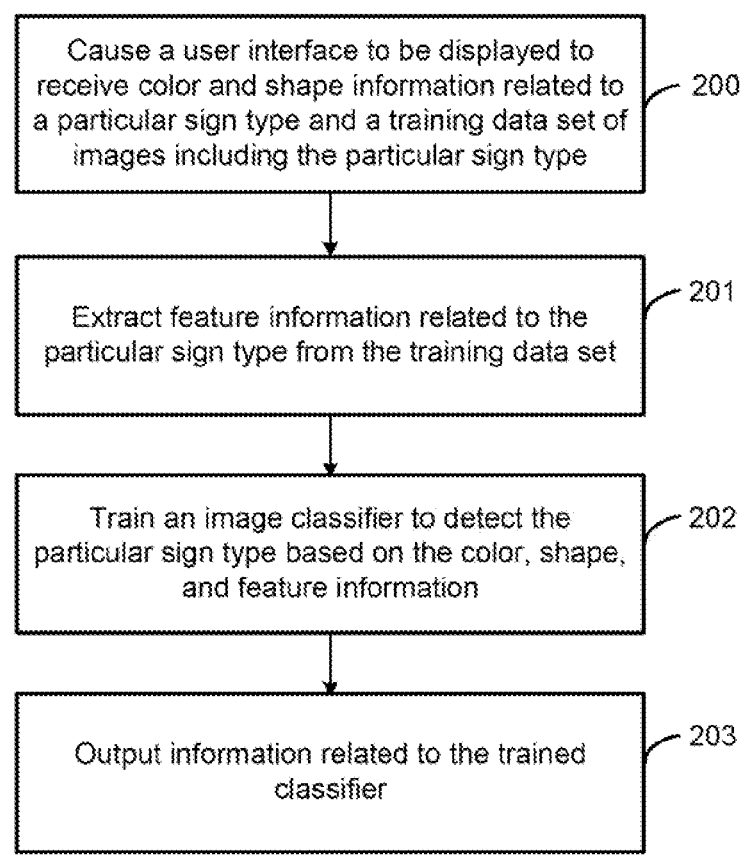
FIG. 2 is a flow chart illustrating one example of a method to create an image sign classifier.

FIG. 2 is a flow chart illustrating one example of a method to create an image sign classifier. A generic road sign classification system may be tailored to recognize a particular type of road sign. For example, a tailored sign classifier may be created based on user input provided to a user interface, such as user input related to the sign characteristics and user input related to a training data set of images. The sign classifier may be used to detect a particular sign type in an input image. The method may be implemented, for example, by the computing system 100 of FIG. 1.

Beginning at 200, a processor causes a user interface to be displayed to receive color and shape information related to a particular sign type and a training data set of images including the particular sign type. The sign type may be any type of road/traffic sign, such as warning, speed, pedestrian, bicycle, and stop signs related to providing rules on a roadway.

The user interface may be any suitable user interface for receiving the sign information. The user interface may include multiple screen views, such as multiple web pages, for receiving the information. The information may be received through any suitable input, such as input from touch, gesture, or a peripheral device.

The user interface may allow for a training data set to be uploaded. For example, a user may select training images including the particular sign type. In some cases, the user may upload training images including different classes of the sign type, such as different kinds of warning signs. In one implementation, the user interface also allows a user to upload negative training images that do not include the particular sign type. In the absence of user provided negative training images, the system may access a set of images that do not include signs to be used as negative training images.

In one implementation, the user interface allows a user to select an option to preprocess the images. The user interface may further present options for how to preprocess the images such that a user may select which methods are to be used. The selected methods may be used on the training images as well as new input images. The preprocessing may, for example, be used to train the classifier to detect signs in different conditions, such as different lighting conditions or with faded coloring.

The color information may be received in any suitable manner. In one implementation, the user interface displays a color palette and allows a user to select a color. In one implementation, the user may select one of the training images and mark a color, such as a pixel or group of pixels, on the training image. The user interface may allow for multiple colors to be input, such as where a sign has a font color and a background color. The user interface may allow a user to select a color and then indicate a position of the color, such as foreground or background. Detecting multiple colors may be useful where one of the colors is less visible due to illumination or color fading.

The user interface may allow for shape input in any suitable manner. The shape information may indicate the shape of the outline of the sign, such as an octagon for a stop sign in the United States. As an example, the user interface may display a library of shapes, and a user may select one of the shapes. The library of shapes may include the most common sign shape outlines, such as circular, diamond, octagon, and triangular shapes. In one implementation, the user interface may allow the user to select a shape in one of the training images. The user interface may allow a user to draw a shape of the sign type. The user interface may allow a user to select multiple shapes and indicate the position of the different shapes, such as where a sign has a first shape as an outline and a second shape appearing within the sign.

In one implementation, the user interface presents a set of tools to be used to detect color and shape and allows the user to select the tools. The processor may select a default tool, and the user may select a different tool, The tool may be for example, a method for detecting color and/or shape.

Continuing to 201, a processor extracts feature information related to the particular sign type from the training data set. For example, the features of the training images may be extracted to determine different classes of the particular sign type. As an example, a sign type may be a warning sign, and the classifier may learn to detect different warning signs based on the features. The feature information may include information related to the appearance of the sign type, such as the position of particular colors and shapes, information about edges within the shape, or information about texture. The feature information may be extracted directly from the images or may be received along with the images. The feature information may be, for example, Histogram of Orient Gradients (HOG) information. In one implementation, the user interface allows a user to select a feature extraction and/or analysis method from a list of available methods. The selected method may be used to analyze the features of the training data set. The processor may use a default method in the absence of a user selection.

Proceeding to 202, a processor trains an image classifier to detect the particular sign type based on the color, shape, and feature. The color and shape information may be used to detect a region in the image of a potential sign of the particular type, and the feature information may be used to confirm the existence of the sign type within the region. In one example, image preprocessing is performed, a candidate sign region is determined based on the color information, potential signs are further localized within the region based on the shape information, and localized potential signs are classified as being the particular sign type or not based on the feature information.

The classifier may be trained according to default methods and/or according to methods selected by the user through the user interface. In one implementation, the user inputs information about the particular sign type, such as a name of the sign type. The processor may output classes of the sign type that were detected to allow the user to provide feedback as to a name of the class and as to whether the classifier should detect signs within the particular class. The classifier may be retrained to recognize a new class of a particular sign based on a new set of training images and feature information. For example, for a new sign class of the same sign type, the color and shape information is the same as for the sign type, and retraining may occur to recognize the new sign class.

Moving to 203, a processor outputs information related to the trained classifier. For example, information about the classifier may be displayed, stored, or transmitted. In some cases, the classifier may be incorporated within a mapping program. For example, an input may be provided to the classifier and the output may be further processed to determine a response, such as a warning to a user related to the detected sign. The image classifier may be transmitted to a different device. For example, the classifier may receive images encountered by a user, such as images captured from a vehicle. The classifier may be transmitted to a mapping device within the vehicle or may receive images from the vehicle via a network.

Figure 3:
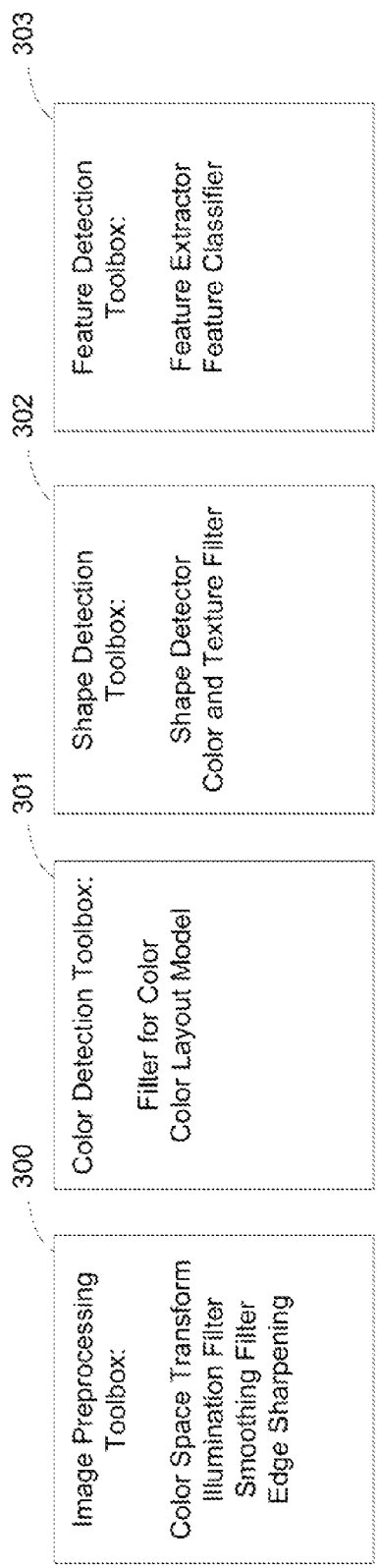
FIG. 3 is a block diagram illustrating one example of methods provided by a user interface for a user to select to train an image sign classifier.

FIG. 3 is a block diagram illustrating one example of methods provided by a user interface for a user to select to train an image sign classifier. For example, a user interface may select default classifier training methods or may present options for a user to select a method for image preprocessing, color detection, shape detection, and/or feature detection.

Block 300 shows an image preprocessing toolbox. The user interface may allow a user to select whether to preprocess the images and which method to use. Example methods that may be presented through the user interface for selection include color space transformation, illumination filtering, smooth filtering, and edge sharpening. Color space transformation may be used to transform the image into a different color format so that color, shape, and texture of the target signs may be more easily detected. Illumination filtering, such as local histogram equalization and/or local contrast enhancement, may be used to normalize illumination and/or enhance the contrast between different image regions. Smooth filtering may be applied to a gray scale image before shape detection to reduce noise. Edge sharpening may be applied to sharpen edges to provide better shape detection. The preprocessing may be performed at any point, such as before or after color or shape detection. The processor may first analyze an image to determine whether to apply a particular preprocessing technique. For example, the processor may determine the color space of the image and determine whether the color space should be changed. In some implementations, the user interface allows a user to select multiple methods. The selected methods may be used on the training data set and/or on future images to be classified.

Block 301 shows a color detection toolbox. For example, the user interface may present the user with options for methods to use to perform color detection. Example methods may include filtering for a particular color and applying a color layout model. Filtering for a particular color may involve learning the scope of a color in the target sign type based on training samples. In some cases for common sign colors, pre-trained models may be available. A color layout model may be used to allow the system to learn the spatial distribution of colors within the target sign, such as the amount of a particular color in the foreground or background of the target sign.

Block 302 shows a shape detection toolbox. The user interface may allow a user to select one or more methods to use to classify images based on shape. For example, a user interface may present options for using a shape detector and/or color and texture filter. In one implementation, a candidate sign region is detected based on color and then filtered further based on shape. A shape detector tool may be a pre-developed tool related to common sign shapes, such as a circle detector based on a Hough transform and a triangle detector based on line and corner detection. The shape may be further learned from training data, such as the width to height ratio of the shape of a particular sign type. A color and texture filter may be applied to remove cluttered background data from an image. The color and texture filter information may be learned from a set of training images. For example, the system may learn that a particular color of the sign is within a particular position relative to the radius or that a texture distribution is within a particular range. The information may be used to remove areas of the image from consideration that do not fit the profile of the target sign type.

Block 303 shows a feature detection toolbox including an option for a feature extractor and a feature classifier. The feature detection tools may be applied to candidate signs identified based on the color and shape detection. The feature detection tools may be applied to the candidate regions of the images. A feature extractor tool may be a pre-developed tool to extract a feature signature from a potential sign region, such as Histogram Oriented Gradient (HOG) information related to local shape information of an object. A feature classifier based on positive and/or negative training images may be applied. The classifier may be, for example, a support vector machine. The classifier may further distinguish between different classes of the particular sign type. A user may select to apply both methods.

Figure 4:
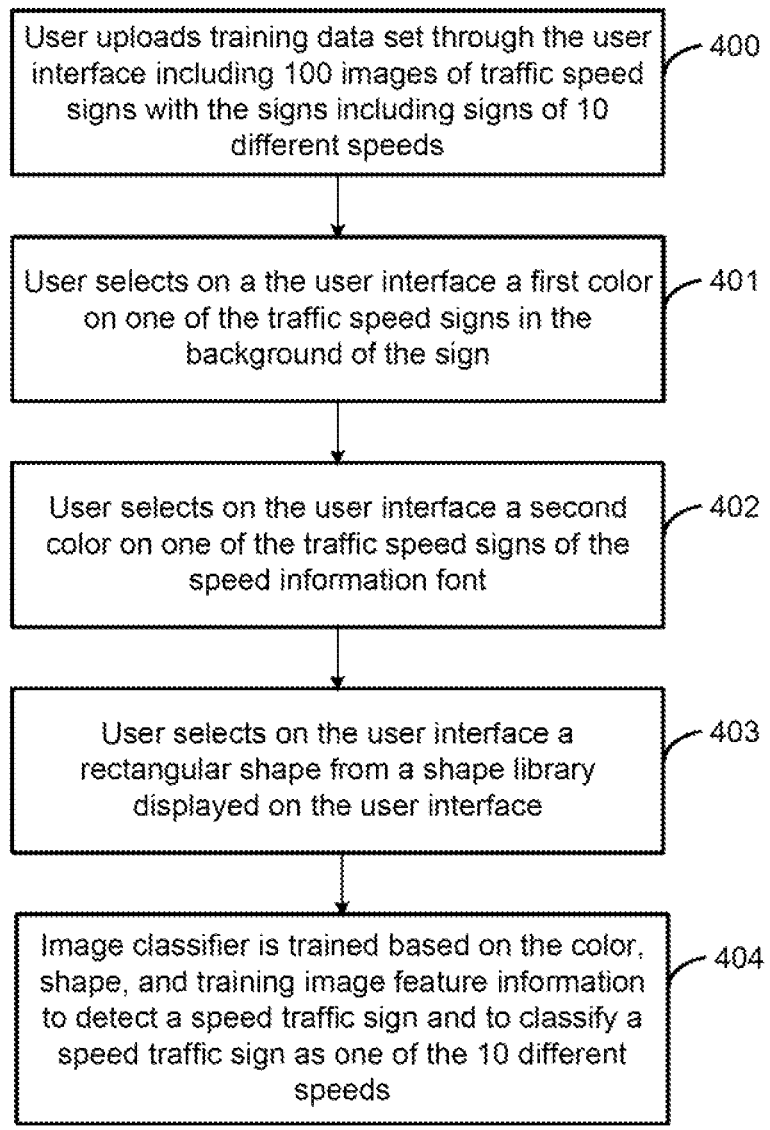
FIG. 4 is a flow chart illustrating one example of creating an image sign classifier to classify speed limit road signs.

FIG. 4 is a flow chart illustrating one example of creating an image sign classifier to classify speed limit road signs. For example, the method of FIG. 2 may be applied. In the example, a user may provide information through the user interface to train an image sign classifier to recognize a United States speed limit sign with a rectangular shape and black speed limit font.

Beginning at 400, a user interface receives a training data set of 100 images of traffic speed signs with the signs including signs of 10 different speeds. For example, the user interface may allow a user to select individual images or a group of images, such as organized in a folder. The positive training data set may include the images of the same sign type but include different classes of that sign type, such as where the signs are speed limit signs with different classes for different speeds. The images may be identified as belonging to the different classes such that the classifier may automatically determine the different classes through features of the images of each class.

Continuing to 401, the user interface allows a user to select a first color on one of the traffic speed signs in the background of the sign, such as a color on the rim or inside the rim of the sign. For example, the user interface may allow user to select one of the training images and then select a pixel on the training image. In some implementations, the user interface allows a user to enter information about the color, such as whether the color is a foreground or background color.

Moving to 402, the user interface allows the user to select a second color on one of the traffic speed signs of the speed information font. For example, the user may select a second portion of the training image representative of the foreground font color.

Proceeding to 403, the user interface allows a user to select a rectangular shape from a shape library displayed on the user interface.

Continuing to 404, the image classifier is trained based on the color, shape, and training image feature information to detect a speed traffic sign and to classify a speed traffic sign as one of the 10 different speeds.

Input images may be supplied to the trained classifier, and the classifier may determine if the image includes a speed traffic sign. If the image includes a speed traffic sign, the classifier may determine which class of speed traffic sign, such as which speed, the recognized traffic sign belongs to. The output of the classifier may be an indication of the presence of a speed sign and the associated speed. The output may be further processed. For example, the information may be displayed to a user or may be compared to a user's speed. Allowing a user to tailor an image classifier to a particular sign type such that the classifier distinguishes between features of classes of the sign type may have many applications, such as classifying signs based on features related to language or region.

The invention claimed is:

1. An apparatus, comprising:
a processor to:
cause a user interface to be displayed to receive color and shape information related to a target sign type in an image and to receive a training data set including images of the target sign type;
extract feature information from the training data set;
train an image sign classifier based on the color, shape, and feature information to recognize the target sign type; and
output information related to the trained classifier.

2. The apparatus of claim 1, wherein the user interface is further to receive information about preprocessing an image and wherein training the image classifier comprises preprocessing the images according to the preprocessing information.

3. The apparatus of claim 1, wherein the user interface receives at least one of: information about a method to classify image color information, information about a method to classify shape information, and information about a method to classify feature information.

4. The apparatus of claim 1, wherein the processor is further to use the extracted feature information to distinguish between a plurality of classes of signs included in the particular sign type.

5. A method, comprising:
cause a user interface to be displayed to receive color and shape information related to a particular sign type and a training data set of images including the particular sign type;
extract feature information related to the particular sign type from the training data set;
train an image classifier to detect the particular sign type based on the color, shape, and feature information; and
output information related to the trained classifier.

6. The method of claim 5, further comprising applying the trained classifier to a new image to determine if the new image includes the particular type of sign.

7. The method of claim 5, wherein the user interface further receives information about preprocessing images to be classified.

8. The method of claim 5, wherein receiving color information comprises causing the user interface to allow a user to select a portion of a color on at least one of the received images to indicate a color of the particular type of sign.

9. The method of claim 5, wherein receiving shape information comprises causing the user interface to allow a user to select a shape from a shape library to indicate a shape of the particular type of sign.

10. The method of claim 5, comprising training the classifier to determine different classes of the particular sign type based on the features extracted from the received images.

11. The method of claim 5, wherein the user interface further receives information related to a method to performing at least one of: color detection, shape detection, and feature detection.

12. A machine-readable non-transitory storage medium comprising instructions executable by a processor to:
create a target sign type image detection classifier based on user input received from a user interface related to the target sign color and shape information;
determine feature information related to different classes of the target sign type based on a training data set including images of the target sign type;
train an image classifier to detect the target sign type and distinguish between classes of the target sign type based on the image feature; and
output information related to the image classifier.

13. The machine-readable non-transitory storage medium of claim 12, wherein instructions to train the image classifier comprise instructions to train the image classifier based on user input related to a classifier training method.

14. The machine-readable non-transitory storage medium of claim 12, further comprising instructions to, subsequent to training the image classifier to detect the target sign type:
receive a new image;
apply the image classifier to determine if the received new image includes the target sign type; and
determine a sign class of a plurality of sign classes included in the target sign type in the new image if the target sign type is included.

15. The machine-readable non-transitory storage medium of claim 12, further comprising instructions to create the target sign type image detection classifier based on user input related to preprocessing image information.

16. The machine-readable non-transitory storage medium of claim 12, wherein the user input related to the target sign shape information comprises a user selection of a particular shape from a shape library including a plurality of shapes of signs.

17. The apparatus of claim 1, wherein the processor is further to apply the trained classifier to a new image to determine if the new image includes the target sign type.

18. The apparatus of claim 17, wherein the processor is further to, in response to a determination that the new image includes the target sign type, determine a sign class of a plurality of sign classes included in the target sign type.

19. The apparatus of claim 1, wherein the feature information extracted from the training data set comprises Histogram of Orient Gradients (HOG) information related to local shape information of an object.

20. The method of claim 5, wherein the feature information extracted from the training data set comprises Histogram of Orient Gradients (HOG) information related to local shape information of an object.

* * * * *

UNITED STATES PATENT AND TRADEMARK OFFICE
CERTIFICATE OF CORRECTION

PATENT NO.         : 9,092,696 B2                                    Page 1 of 1
APPLICATION NO.    : 13/850413
DATED              : July 28, 2015
INVENTOR(S)        : Tong Zhang It is certified that error appears in the above-identified patent and that said Letters Patent is hereby corrected as shown below:

In the Drawings
In Sheet 4 of 4, reference numeral 401, line 1, delete "a the" and insert -- the --, therefor.

Signed and Sealed this
Sixteenth Day of August, 2016

Michelle K. Lee
*Director of the United States Patent and Trademark Office*